United States Patent
Bian et al.

(10) Patent No.: US 12,541,057 B2
(45) Date of Patent: Feb. 3, 2026

(54) PHOTONIC COMPONENTS WITH CHAMFERED SIDEWALLS

(71) Applicant: GlobalFoundries U.S. Inc., Malta, NY (US)

(72) Inventors: Yusheng Bian, Ballston Lake, NY (US); Kenneth Giewont, Hopewell Junction, NY (US); Takako Hirokawa, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 250 days.

(21) Appl. No.: 18/225,709

(22) Filed: Jul. 25, 2023

(65) Prior Publication Data
US 2025/0035840 A1     Jan. 30, 2025

(51) Int. Cl.
*H04B 10/00*     (2013.01)
*G02B 6/122*     (2006.01)
*G02B 6/13*      (2006.01)

(52) U.S. Cl.
CPC ............. *G02B 6/1228* (2013.01); *G02B 6/13* (2013.01)

(58) Field of Classification Search
CPC ........... G02B 6/1228; G02B 6/13; G02B 2006/12123; G02B 6/12004; G02B 6/4203; G02B 6/122; G02B 2006/12147; H10F 30/223; H10F 77/147
See application file for complete search history.

(56) References Cited

U.S. PATENT DOCUMENTS

| | | | | |
|---|---|---|---|---|
| 5,121,182 A | * | 6/1992 | Kuroda | G02B 6/42 257/14 |
| 5,701,379 A | * | 12/1997 | Takeuchi | G02B 6/125 257/E31.128 |
| 7,120,350 B2 | * | 10/2006 | Block | G02B 6/12004 385/146 |
| 7,251,406 B2 | * | 7/2007 | Luo | G02B 6/1228 385/28 |

(Continued)

FOREIGN PATENT DOCUMENTS

WO    2018014365 A1    1/2018

OTHER PUBLICATIONS

Long Chen, Po Dong, and Michal Lipson, "High performance germanium photodetectors integrated on submicron silicon waveguides by low temperature wafer bonding," Opt. Express 16, 11513-11518 (2008).

(Continued)

*Primary Examiner* — Agustin Bello
(74) *Attorney, Agent, or Firm* — Thompson Hine LLP; Anthony Canale

(57) ABSTRACT

Structures for a photonics chip that include a photonic component and methods of forming such structures. The structure may comprise a photodetector on a substrate and a waveguide core. The photodetector includes a light-absorbing layer having a longitudinal axis, a first sidewall, and a second sidewall adjoined to the first sidewall at an interior angle. The first sidewall is slanted relative to the longitudinal axis, and the second sidewall is oriented transverse to the longitudinal axis. The waveguide core includes a tapered section adjacent to the first sidewall and the second sidewall of the light-absorbing layer.

20 Claims, 10 Drawing Sheets

(56) References Cited

U.S. PATENT DOCUMENTS

| | | | |
|---|---|---|---|
| 8,093,080 B2* | 1/2012 | Liao | G02B 6/12004 438/38 |
| 8,242,432 B2* | 8/2012 | Feng | H10F 30/2255 250/214 R |
| 8,989,540 B2* | 3/2015 | Feng | G02B 6/12004 385/32 |
| 9,279,936 B2* | 3/2016 | Qian | G02B 6/131 |
| 9,362,428 B2* | 6/2016 | Chen | H10F 77/413 |
| 9,377,581 B2* | 6/2016 | Li | H10F 30/223 |
| 10,830,968 B2* | 11/2020 | Cho | H10F 30/22 |
| 11,428,877 B2* | 8/2022 | Cho | H10F 77/413 |
| 2003/0161571 A1* | 8/2003 | Davids | G02B 6/4214 385/129 |
| 2006/0133754 A1* | 6/2006 | Patel | G02B 6/1228 385/129 |
| 2007/0104411 A1* | 5/2007 | Ahn | G02B 6/12004 385/14 |
| 2008/0105940 A1* | 5/2008 | Piede | H10F 30/221 257/E31.127 |
| 2009/0324164 A1* | 12/2009 | Reshotko | G02B 6/1228 257/432 |
| 2013/0020668 A1 | 1/2013 | Qian et al. | |
| 2016/0293788 A1* | 10/2016 | Okumura | H10F 77/413 |
| 2017/0104109 A1* | 4/2017 | Simoyama | G02B 6/2813 |
| 2019/0086609 A1 | 3/2019 | Shaw | |
| 2019/0212498 A1 | 7/2019 | Fathololoumi et al. | |
| 2019/0353845 A1* | 11/2019 | Fathololoumi | H10F 77/413 |
| 2020/0303903 A1* | 9/2020 | Yagi | H01L 21/76251 |
| 2022/0115546 A1 | 4/2022 | Aboketaf et al. | |
| 2022/0344523 A1 | 10/2022 | Chowdhury et al. | |
| 2025/0035840 A1* | 1/2025 | Bian | G02B 6/12004 |

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th31.4.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

A. Chowdhury et al., "High Performance Avalanche Photodiode in a Monolithic Silicon Photonics Technology," 2022 Optical Fiber Communications Conference and Exhibition (OFC), San Diego, CA, USA, 2022, pp. 1-3.

W. S. Lee et al., "Automatic Waveguide Balancing Using Point Set Operations," in Optical Fiber Communication Conference (OFC) 2022, S. Matsuo, D. Plant, J. Shan Wey, C. Fludger, R. Ryf, and D. Simeonidou, eds., Technical Digest Series (Optica Publishing Group, 2022), paper M3E.2.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, doi: 10.1109/JSTQE.2023.3238290.

Pavel Cheben et al., "Refractive index engineering with subwavelength gratings for efficient microphotonic couplers and planar waveguide multiplexers," Optics Letter 35, 2526-2528 (2010).

Martin Papes et al., "Fiber-chip edge coupler with large mode size for silicon photonic wire waveguides," Optics Express 24, 5026-5038 (2016).

Mu, Xin, Sailong Wu, Lirong Cheng, and H.Y. Fu. 2020. "Edge Couplers in Silicon Photonic Integrated Circuits: A Review" Applied Sciences 10, No. 4: 1538. https://doi.org/10.3390/app10041538.

Y. Bian et al., "Monolithically integrated self-aligned SiN edge coupler with <0.6/0.8 dB TE/TM insertion loss, <-39 dB back reflection and >520 mW high-power handling capability," in Optical Fiber Communication Conference (OFC) 2023, Technical Digest Series (Optica Publishing Group, 2023), paper M3C.3.

Bian, Yusheng, "Gratings With Non-Rectangular Segments" filed on Jul. 11, 2022 as a U.S. Appl. No. 17/861,345.

Bian, Yusheng et al., "Spot-Size Converters With Angled Facets" filed on Feb. 24, 2022 as a U.S. Appl. No. 17/679,188.

European Patent Office, Partial European Search Report and Opinion issued in European Patent Application No. 241527456 on Jul. 3, 2024; 12 pages.

European Patent Office; Extended European Search Report and Opinion issued in European Patent Application No. 24152745.6 on Oct. 2, 2025; 13 pages.

\* cited by examiner

PHOTONIC COMPONENTS WITH CHAMFERED SIDEWALLS

BACKGROUND

This disclosure relates to photonics chips and, more specifically, to structures for a photonics chip that include a photonic component and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as an optical fiber or a laser. The light source may be coupled by an edge coupler, also referred to as a spot-size converter, to the photonic integrated circuit on the photonics chip. The edge coupler is configured to transfer light of a given mode from the light source to the photonic integrated circuit. A photodetector may be employed in the photonic integrated circuit to convert light, which may be modulated as an optical signal, into an electrical signal.

Improved structures for a photonics chip that include a photonic component and methods of forming such structures are needed.

SUMMARY

In an embodiment of the invention, a structure for a photonics chip is provided. The structure comprises a photodetector on a substrate and a waveguide core. The photodetector includes a light-absorbing layer having a longitudinal axis, a first sidewall, and a second sidewall adjoined to the first sidewall at an interior angle. The first sidewall is slanted relative to the longitudinal axis, and the second sidewall is oriented transverse to the longitudinal axis. The waveguide core includes a tapered section adjacent to the first sidewall and the second sidewall of the light-absorbing layer.

In an embodiment of the invention, a structure for a photonics chip is provided. The structure comprises an edge coupler on a substrate. The edge coupler includes a longitudinal axis and a facet, the facet has a first sidewall and a second sidewall adjoined to the first sidewall at an interior angle, the first sidewall is slanted relative to the longitudinal axis, and the second sidewall is oriented transverse to the longitudinal axis.

In an embodiment of the invention, a method of forming a structure for a photonics chip is provided. The method comprises forming a light-absorbing layer of a photodetector on a substrate. The light-absorbing layer has a longitudinal axis, a first sidewall, and a second sidewall adjoined to the first sidewall at an interior angle. The first sidewall is slanted relative to the longitudinal axis, and the second sidewall is oriented transverse to the longitudinal axis. The method further comprises forming a waveguide core including a tapered section adjacent to the first sidewall and the second sidewall of the light-absorbing layer.

BRIEF DESCRIPTION OF THE DRAWINGS

The accompanying drawings, which are incorporated in and constitute a part of this specification, illustrate various embodiments of the invention, and together with a general description of the invention given above and the detailed description of the embodiments given below, serve to explain the embodiments of the invention. In the drawings, like reference numerals refer to like features in the various views.

DETAILED DESCRIPTION

Figure 1:
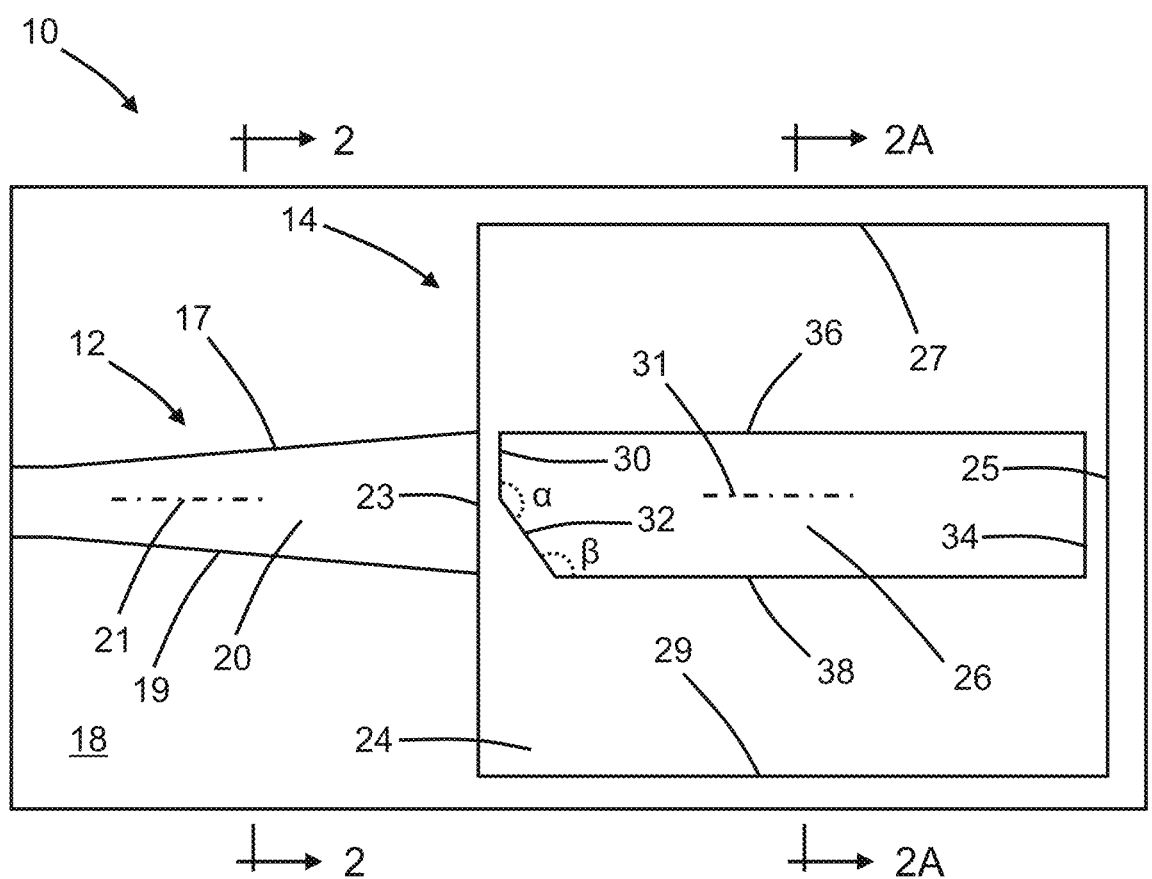
FIG. 1 is a top view of a structure at an initial fabrication stage of a processing method in accordance with embodiments of the invention.
Figure 2:
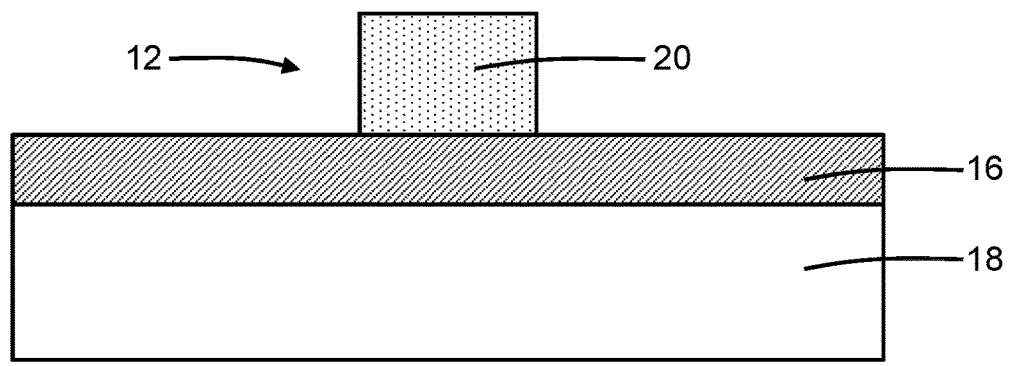
FIG. 2 is a cross-sectional view taken generally along line 2-2 in FIG. 1.
Figure 2A:
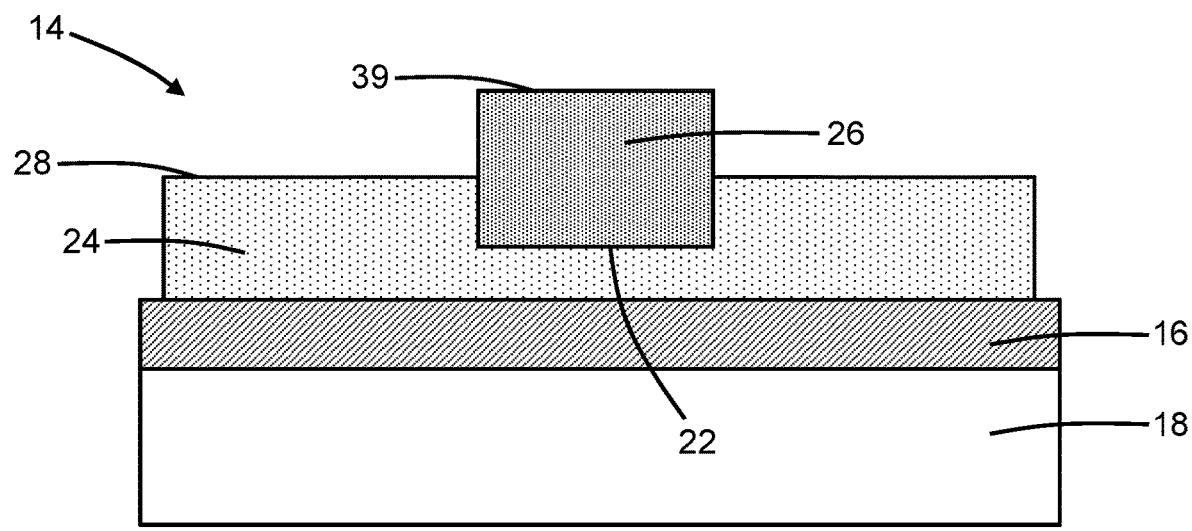
FIG. 2A is a cross-sectional view taken generally along line 2A-2A in FIG. 1.

With reference to FIGS. 1, 2, 2A and in accordance with embodiments of the invention, a structure 10 includes a waveguide core 12 and a photodetector 14 representing photonic components that are positioned on, and above, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be a buried oxide layer of a silicon-on-insulator substrate, and the dielectric layer 16 may separate the waveguide core 12 and the photodetector 14 from the semiconductor substrate 18.

The waveguide core 12 includes a tapered section 20 that is positioned adjacent to the photodetector 14. The tapered section 20, which extends lengthwise along a longitudinal axis 21, has a sidewall 17 and a sidewall 19 opposite to the sidewall 17. The photodetector 14 includes a pad 24 having side edges 23, 25, 27, 29 and a semiconductor layer 26 that is disposed on the pad 24 interior of the side edges 23, 25, 27, 29. The tapered section 20 may be connected to the side edge 23 of the pad 24 such that the sidewalls 17, 19 intersect the side edge 23.

The tapered section 20 may have a width dimension that increases with decreasing distance along the longitudinal axis 21 from the side edge 23 of the pad 24. In an embodiment, the width dimension of the tapered section 20 may increase linearly with decreasing distance from the side edge 23. In an alternative embodiment, the width dimension of the tapered section 20 may vary based on a non-linear function, such as a quadratic function, a cubic function, a parabolic function, a sine function, a cosine function, a Bezier function, or an exponential function. In an embodiment, the tapered section 20 may include a single stage of tapering characterized by a taper angle. In an alternative embodiment, the tapered section 20 may taper in multiple stages each characterized by a different taper angle.

In an alternative embodiment, the tapered section 20 of the waveguide core 12 may be tapered in the height dimension as well as tapered in the width dimension. For example, the height dimension of the tapered section 20 may increase with decreasing distance from the side edge 23 of the pad 24. In an alternative embodiment, the semiconductor substrate 18 may include a cavity or undercut beneath all or part of the tapered section 20 of the waveguide core 12.

In an embodiment, the waveguide core 12 and the pad 24 of the photodetector 14 may be comprised of a material having a refractive index that is greater than the refractive index of silicon dioxide. In an embodiment, the waveguide core 12 and the pad 24 of the photodetector 14 may be comprised of a semiconductor material. In an embodiment, the waveguide core 12 and the pad 24 of the photodetector 14 may be comprised of single-crystal silicon. The waveguide core 12 and the pad 24 of the photodetector 14 may be formed by patterning a layer comprised of their constituent material with lithography and etching processes. In an embodiment, the waveguide core 12 and the pad 24 of the photodetector 14 may be formed by patterning the semiconductor material (e.g., single-crystal silicon) of a device layer of a silicon-on-insulator substrate. In an embodiment, the tapered section 20 of the waveguide core 12 may be a stacked waveguide that includes, for example, a tapered section of another waveguide core comprised of a different material, such as polysilicon or silicon nitride, that is disposed in a level above the tapered section 20.

The semiconductor layer 26 of the photodetector 14 may be comprised of a light-absorbing material that generates charge carriers from photons of absorbed light by the photoelectric effect. In an embodiment, the semiconductor layer 26 may be comprised of a material having a composition that includes germanium. In an embodiment, the semiconductor layer 26 may be comprised of intrinsic germanium. In an alternative embodiment, the semiconductor layer 26 may be comprised of a different light-absorbing material, such as a III-V compound semiconductor material or silicon. The semiconductor layer 26 may be formed by an epitaxial growth process. In an embodiment, the semiconductor layer 26 may be epitaxially grown inside a trench 22 that is patterned in the pad 24 such that the semiconductor layer 26 includes a lower portion disposed below a top surface 28 of the pad 24 and an upper portion disposed above the top surface 28 of the pad 24.

The semiconductor layer 26 has a non-rectangular shape from a perspective in a vertical direction normal to a top surface 39 of the semiconductor layer 26. In an embodiment, the shape of the semiconductor layer 26 may conform to the shape of the trench 22 that is patterned in the pad 24. In an embodiment, the semiconductor layer 26 may have more than four (4) sidewalls. In an embodiment, the semiconductor layer 26 may have a sidewall 30 and a sidewall 32 that are positioned adjacent to the side edge 23 of the pad 24, a sidewall 34 that is positioned adjacent to the side edge 25 of the pad 24, a sidewall 36 that is positioned adjacent to the side edge 27 of the pad 24, and a sidewall 38 that is positioned adjacent to the side edge 29 of the pad 24. In the representative embodiment, the sidewalls 30, 32, 34, 36, 38, which surround the semiconductor layer 26, may have a pentagonal or pentangular shape. Each of the sidewalls 30, 32, 34, 36, 38 includes an upper portion that is disposed above the top surface 28 of the pad 24 and a lower portion that is disposed below the top surface 28 of the pad 24.

The sidewalls 30, 32, 34, 36, 38 may intersect at respective corners. In an embodiment, the sidewall 30 may intersect the sidewall 32 at a sharp corner, the sidewall 30 may intersect the sidewall 36 at a sharp corner, and the sidewall 32 may intersect the sidewall 38 at a sharp corner. In an alternative embodiment, the corner at which the sidewalls 30, 32 intersect, the corner at which the sidewalls 30, 36 intersect, and the corner at which the sidewalls 32, 38 intersect may be rounded or radiused. The sidewall 30 and the sidewall 36 may adjoin at a right-angle corner, the sidewall 34 and the sidewall 36 may adjoin at a right-angle corner, and sidewall 36 and the sidewall 38 may adjoin at a right-angle corner.

The sidewall 32 defines a chamfer that connects the sidewall 30 to the sidewall 38. The sidewall 30 may adjoin the sidewall 32 at an interior angle $\alpha$, and the sidewall 32 may adjoin the sidewall 38 at an interior angle $\beta$. In an embodiment, the interior angle $\alpha$ may be an obtuse angle. In an embodiment, the interior angle $\beta$ may be an obtuse angle. In an embodiment, the interior angle $\alpha$ and the interior angle $\beta$ may be obtuse angles. The tapered section 20 of the waveguide core 12 is positioned adjacent to both of the sidewalls 30, 32 of the semiconductor layer 26. In an embodiment, the side edge 23 of the pad 24 may be positioned between the tapered section 20 of the waveguide core 12 and the sidewalls 30, 32 of the semiconductor layer 26.

The semiconductor layer 26 has a longitudinal axis 31, which may be aligned parallel to the longitudinal axis 21 of the tapered section 20. The sidewall 30 may be oriented transverse to the longitudinal axis 31 such that the longitudinal axis 31 is perpendicular to the sidewall 30. The sidewall 32 may be aligned at an angle relative to the longitudinal axis 31 such that the interior angle $\alpha$ is obtuse. The sidewalls 30, 32 may be considered to define a facet of the semiconductor layer 26 of the photodetector 14 that is configured to receive light from the tapered section 20 of the waveguide core 12.

In an alternative embodiment, the semiconductor layer 26 may be formed on the top surface 28 of the pad 24, instead of inside the trench 22, such that the semiconductor layer 26 is disposed fully above the top surface 28. In this regard, the semiconductor layer 26 may be grown from the top surface 28 of the pad 24 and then patterned by lithography and etching processes to define the sidewalls 30, 32, 34, 36, 38 of the non-rectangular shape. In an alternative embodiment, the semiconductor layer 26 may include an additional sidewall that defines a chamfer that connects the sidewall 30 to the sidewall 36.

Figure 3:
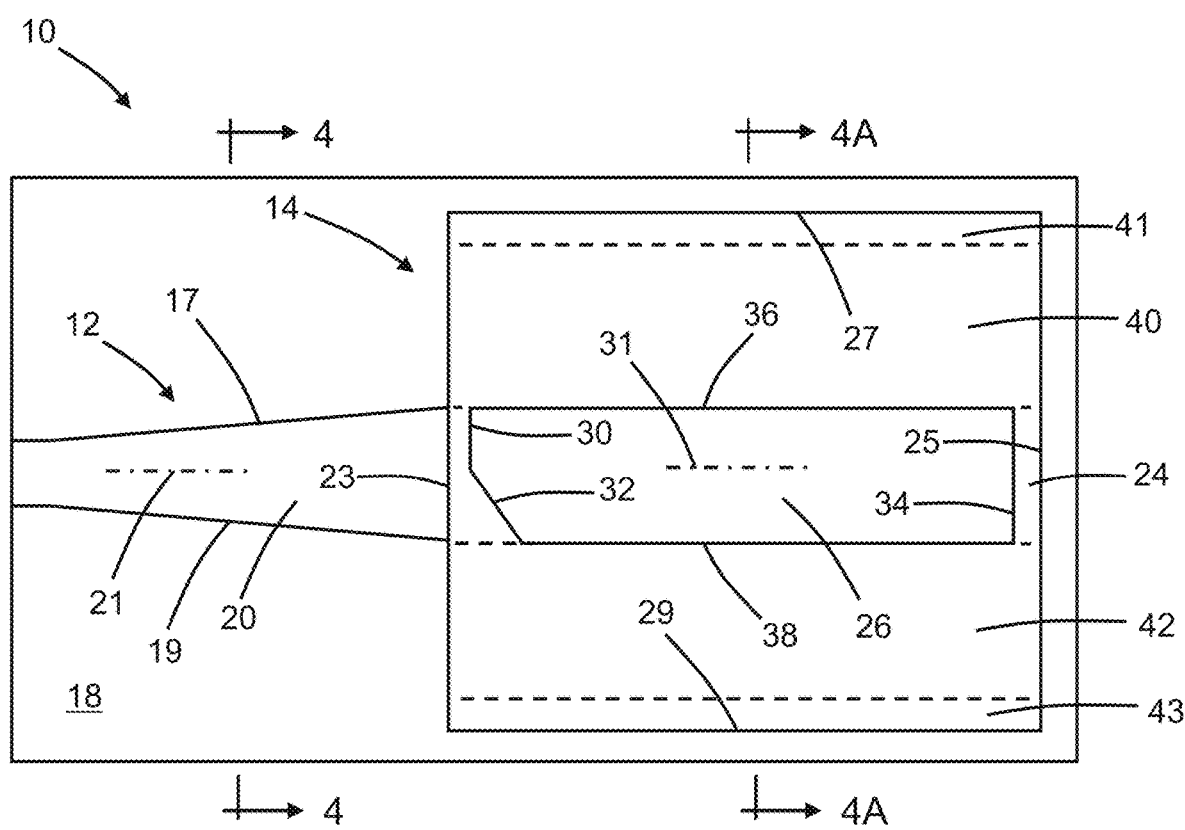
FIG. 3 is a top view of the structure at a fabrication stage of the processing method subsequent to FIGS. 1, 2, 2A.
Figure 4:
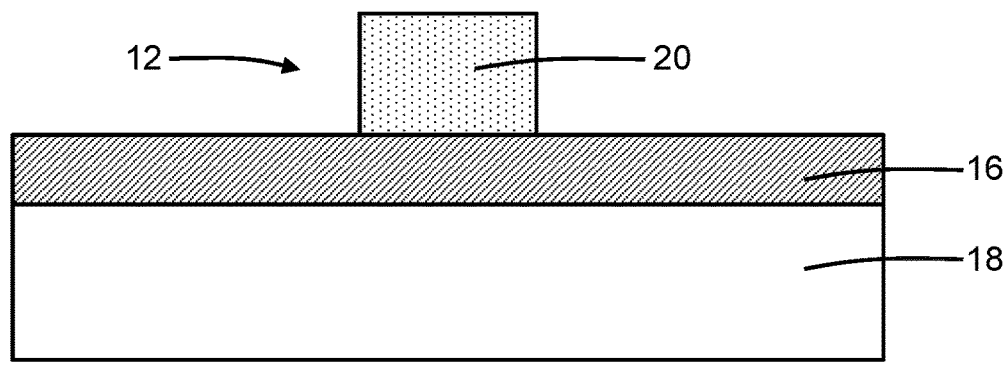
FIG. 4 is a cross-sectional view taken generally along line 4-4 in FIG. 3.
Figure 4A:
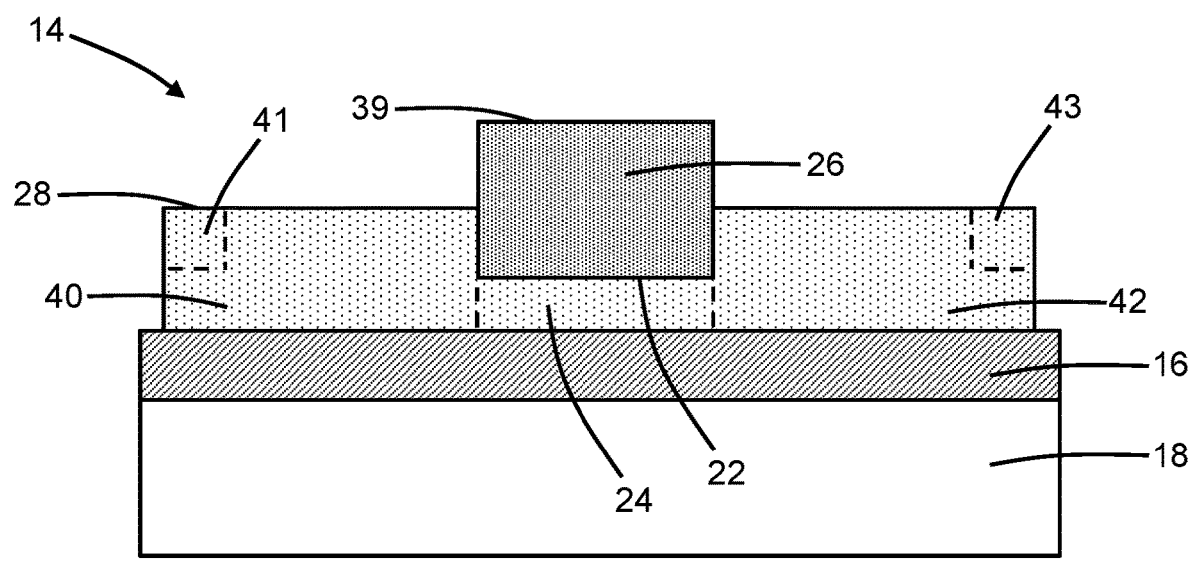
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, the structure 10 may include a doped region 40 and a doped region 42 that are formed in respective portions of the pad 24. The doped regions 40, 42, which differ in conductivity type, may extend through the entire thickness of the pad 24 to the underlying dielectric layer 16. The semiconductor layer 26 is laterally positioned between the doped region 40 and the doped region 42. The doped region 40 and the doped region 42 may respectively define an anode and a cathode of the photodetector 14.

The doped region 40 may be formed by, for example, ion implantation with an implantation mask having an opening that determines the implanted area of the pad 24. The implantation mask may include a layer of photoresist applied by a spin-coating process, pre-baked, exposed to light projected through a photomask, baked after exposure, and developed with a chemical developer to define the opening over the area of the pad 24 to be implanted. The implantation conditions (e.g., ion species, dose, kinetic energy) may be selected to tune the electrical and physical characteristics of the doped region 40. The implantation mask may be stripped after forming the doped region 40. In an embodiment, the semiconductor material of the doped region 40 may contain a p-type dopant (e.g., boron) that provides p-type electrical conductivity. In an alternative embodiment, a portion of the semiconductor layer 26 immediately adjacent to the doped region 40 and an underlying portion of the pad 24 may be implanted with the p-type dopant due to overlap of the opening in the implantation mask.

The doped region 42 may be formed by, for example, ion implantation with an implantation mask with an opening that determines an implanted area of the pad 24. The implantation mask may include a layer of photoresist applied by a spin-coating process, pre-baked, exposed to light projected through a photomask, baked after exposure, and developed with a chemical developer to define the opening over the area of the pad 24 to be implanted. The implantation conditions (e.g., ion species, dose, kinetic energy) may be selected to tune the electrical and physical characteristics of the doped region 42. The implantation mask may be stripped after forming the doped region 42. In an embodiment, the semiconductor material of the doped region 42 may contain an n-type dopant (e.g., phosphorus and/or arsenic) that provides n-type electrical conductivity. In an alternative embodiment, a portion of the semiconductor layer 26 immediately adjacent to the doped region 42 and an underlying portion of the pad 24 may be implanted with the n-type dopant due to overlap of the opening in the implantation mask.

A portion of the pad 24 beneath the semiconductor layer 26 may be comprised of intrinsic semiconductor material, such as intrinsic silicon, that is not doped by the ion implantation forming the doped regions 40, 42. The longitudinal axis 21 of the tapered section 20 may be aligned with the intrinsic portion of the pad 24. In an embodiment, the intrinsic portion of the pad 24 may extend from the side edge 23 of the pad 24 to the side edge 25 of the pad 24. The doped region 40, the intrinsic semiconductor materials of the semiconductor layer 26 and the portion of the pad 24 beneath the semiconductor layer 26, and the doped region 42 may define a lateral p-i-n diode structure that provides the functionality of the photodetector 14.

A heavily-doped region 41 may be formed by a masked ion implantation in a portion of the doped region 40 adjacent to the side edge 27, and a heavily-doped region 43 may be formed by a masked ion implantation in a portion of the doped region 42 adjacent to the side edge 29. The heavily-doped region 41 may be doped to the same conductivity type as the doped region 40 but at a higher dopant concentration. The heavily-doped region 43 may be doped to the same conductivity type as the doped region 42 but at a higher dopant concentration.

Figure 5:
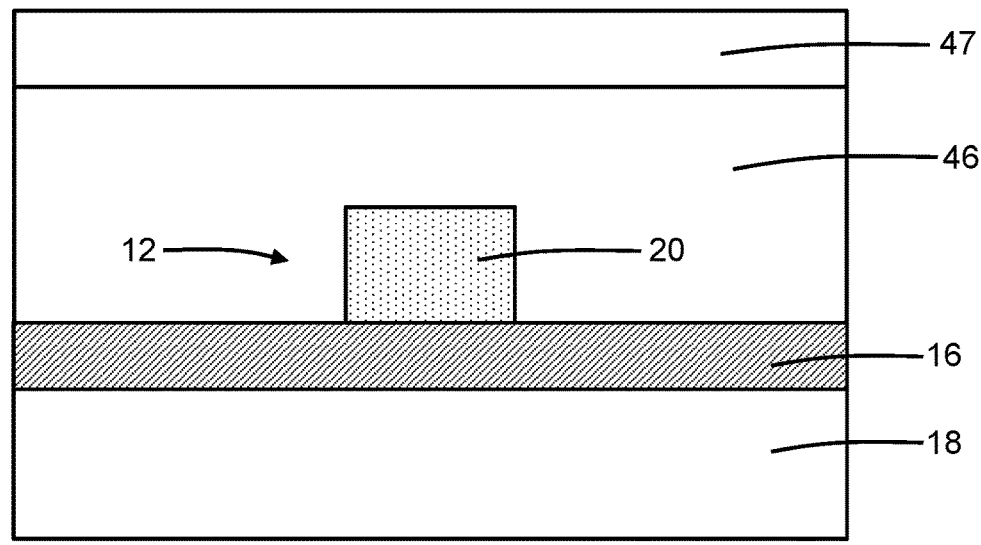
FIGS. 5, 5A are cross-sectional views of the structure at a fabrication stage of the processing method subsequent to FIGS. 3, 4, 4A.
Figure 5A:
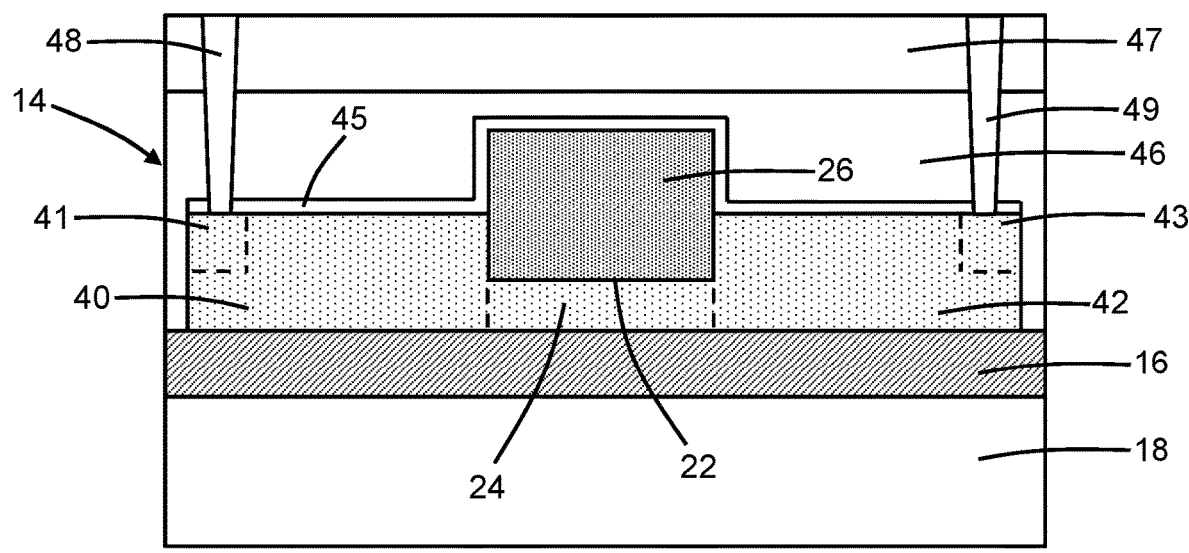

With reference to FIGS. 5, 5A in which like reference numerals refer to like features in FIGS. 3, 4, 4A and at a subsequent fabrication stage, a conformal dielectric layer 45 may be formed that extends across the pad 24 and semiconductor layer 26 following the topography created by the semiconductor layer 26. The conformal dielectric layer 45 may be comprised of a dielectric material, such as silicon nitride. An additional conformal dielectric layer (not shown) comprised of a dielectric material, such as silicon dioxide, may be disposed between the semiconductor layer 26 and the conformal dielectric layer 45.

Dielectric layers 46, 47 are formed on the waveguide core 12 and the photodetector 14. In an embodiment, the dielectric layers 46, 47 may be comprised of a dielectric material, such as silicon dioxide, that has a lower refractive index than the material of the waveguide core 12. The dielectric layer 46 may be deposited and planarized, and the dielectric layer 47 may be deposited on the planarized dielectric layer 46.

Contacts 48 may be formed that penetrate fully through the conformal dielectric layer 45 and the dielectric layers 46, 47 to land on the heavily-doped region 41, and contacts 49 may be formed that penetrate fully through the conformal dielectric layer 45 and the dielectric layers 46, 47 to land on the heavily-doped region 43. The heavily-doped region 41 electrically couples the contacts 48 to the doped region 40 with a reduced contact resistance. The heavily-doped region 43 electrically couples the contacts 49 to the doped region 42 with a reduced contact resistance. The contacts 48, 49 may be comprised of a metal, such as tungsten. The doped regions 40, 42 may be biased through the contacts 48, 49.

In use, light (e.g., laser light) propagates in the waveguide core 12 toward the photodetector 14 and is coupled from the tapered section 20 of the waveguide core 12 to the semiconductor layer 26 of the photodetector 14. The waveguide core 12 may support propagation of light with transverse-electric polarization, transverse-magnetic polarization, or a combination of both. In an embodiment, the light received by the photodetector 14 may be modulated as an optical signal. The semiconductor layer 26 absorbs photons of the light and converts the absorbed photons into charge carriers by the photoelectric effect. The biasing of the doped regions 40, 42 causes the charge carriers to be collected and output to provide, as a function of time, a measurable photocurrent.

The sidewalls 30, 32 of the semiconductor layer 26 positioned adjacent to the tapered section 20 of the waveguide core 12 may significantly reduce optical reflection loss while maintaining a high coupling efficiency and without introducing a loss of responsivity for the photodetector 14. The sidewalls 30, 32 of the semiconductor layer 26 may assist with sustaining modal overlap between the mode in the waveguide core 12 and the mode in the semiconductor layer 26.

Figure 6:
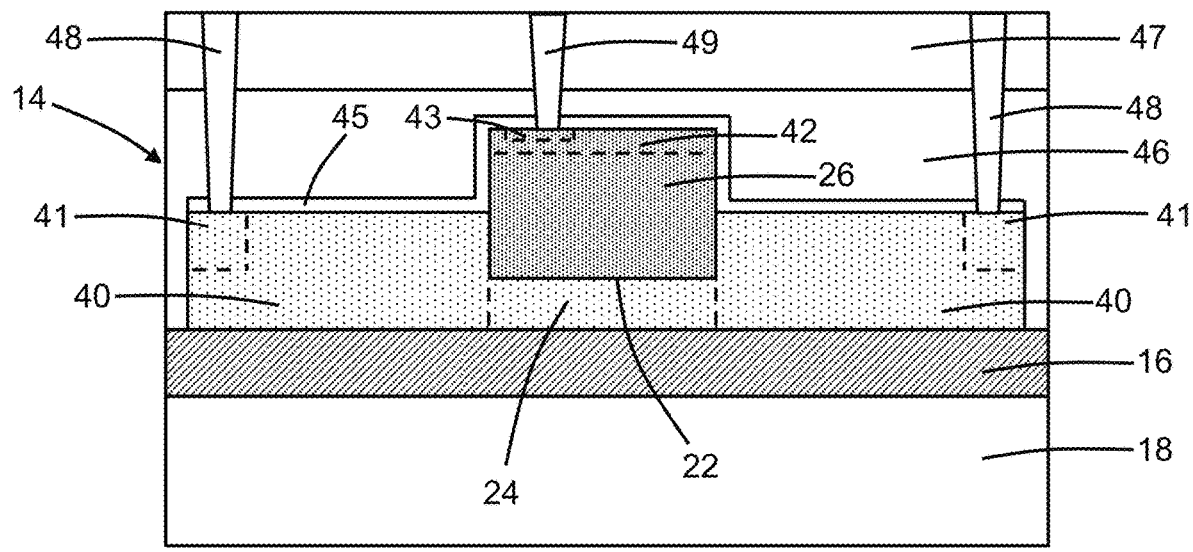
FIG. 6 is a cross-sectional view of a structure in accordance with alternative embodiments of the invention.

With reference to FIG. 6 and in accordance with alternative embodiments, the structure 10 may be modified such that the photodetector 14 has a vertical arrangement instead of a lateral arrangement. Specifically, in the vertical arrangement, the doped region 40 and heavily-doped region 41 may be arranged in the pad 24 on both sides of the semiconductor layer, and the doped region 42 and heavily-doped region 43 may be arranged in the semiconductor layer 26.

In an alternative embodiment, the structure 10 may be configured with the doped region 40 in the pad 24 only adjacent to one side of the semiconductor layer 26. In an alternative embodiment, the photodetector 14 may be configured as an avalanche photodetector that includes an intrinsic semiconductor region in the pad 24 defining a multiplication region and an additional doped region in the pad 24 defining a charge control region.

Figure 7:
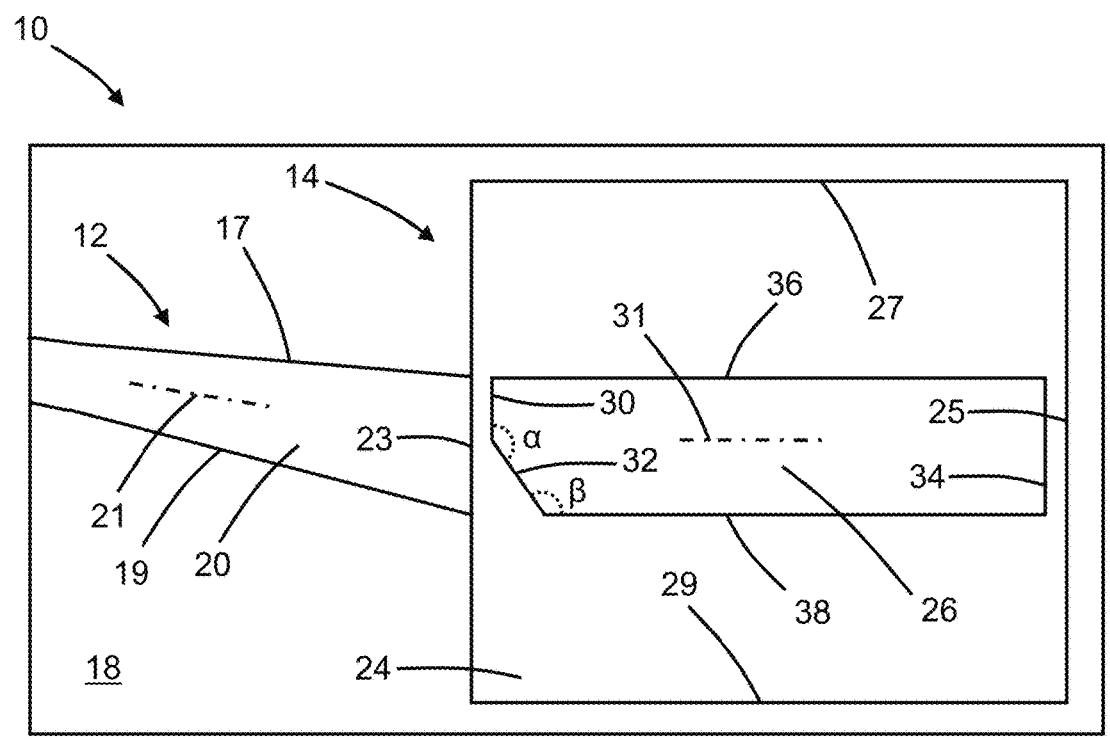
FIG. 7 is a top view of a structure in accordance with alternative embodiments of the invention.
Figure 7A:
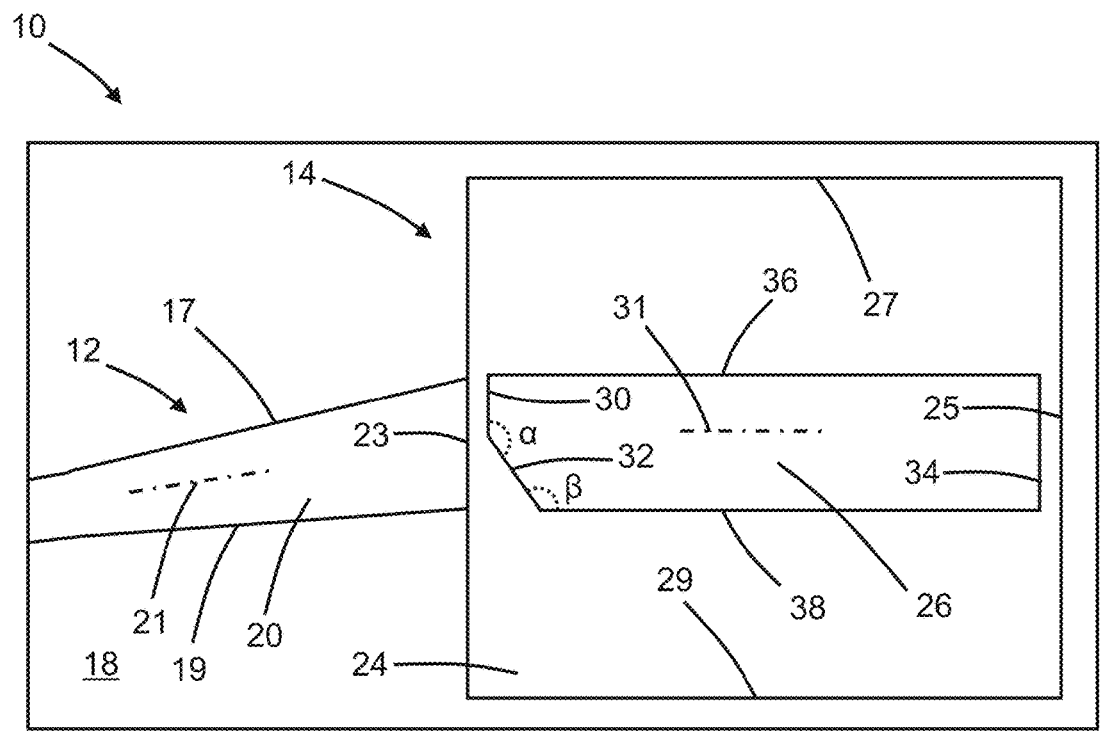
FIG. 7A is a top view of a structure in accordance with alternative embodiments of the invention.

With reference to FIGS. 7, 7A and in accordance with alternative embodiments, the longitudinal axis 21 of the tapered section 20 may be angled to further reduce optical return loss from the side edge 23 of the pad 24 and the sidewalls 30, 32 of the semiconductor layer 26. Specifically, the longitudinal axis 31 of the semiconductor layer 26 may be aligned at an acute angle relative to the longitudinal axis 21 of the tapered section 20. In an embodiment and as shown in FIG. 7, the tapered section 20 may be oriented to increase the angular differential between the longitudinal axis 21 and the plane of the sidewall 32 such that the angle of incidence of light relative to the sidewall 32 is increased. In an embodiment and as shown in FIG. 7A, the tapered section 20 may be oriented to decrease the angular differential between the sidewall 32 and the longitudinal axis 21.

Figure 8:
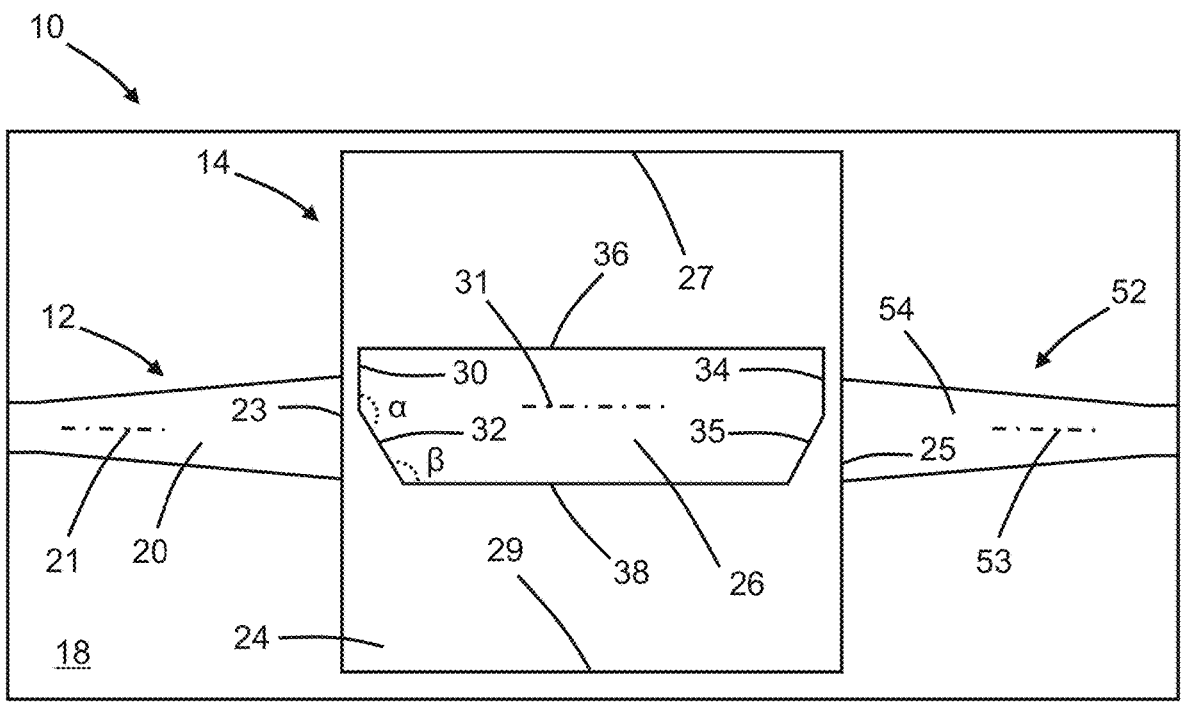
FIG. 8 is a top view of a structure in accordance with alternative embodiments of the invention.

With reference to FIG. 8 and in accordance with alternative embodiments, the semiconductor layer 26 may include a sidewall 35 defines a chamfer that connects the sidewall 34 to the sidewall 38. The sidewall 35 may adjoin the sidewall 34 at an interior angle similar to the interior angle α, and the sidewall 35 may adjoin the sidewall 38 at an interior angle similar to the interior angle β. In an embodiment, one or both interior angles may be obtuse angles. The sidewall 34 may be oriented transverse to the longitudinal axis 31 such that the longitudinal axis 31 is perpendicular to the sidewall 34. The sidewall 35 may be aligned at an angle relative to the longitudinal axis 31.

The structure 10 may include a waveguide core 52 having a tapered section 54 that is positioned adjacent to the side edge 25 of the pad 24 that is opposite from the side edge 23. The tapered section 54 of the waveguide core 52 is positioned adjacent to both of the sidewalls 34, 35 of the semiconductor layer 26. In an embodiment, the side edge 25 of the pad 24 may be positioned between the tapered section 54 of the waveguide core 52 and the sidewalls 34, 35 of the semiconductor layer 26. The tapered section 54 of the waveguide core 52 may be similar or identical to the tapered section 20 of the waveguide core 12. In an embodiment, the waveguide core 52 may be comprised of the same material as the waveguide core 12. The sidewall 34 and the sidewall 35 define a facet of the semiconductor layer 26 of the photodetector 14 that is configured to receive light from the tapered section 54 of the waveguide core 52.

The tapered section 54 of the waveguide core 52 may supply another input to the photodetector 14 in addition to the input provided by the tapered section 20 of the waveguide core 12. For example, the total power delivered to the photodetector 14 may be split between the input provided by the tapered section 20 and the input provided by the tapered section 54. The sidewall 35 of the semiconductor layer 26 may significantly reduce optical reflection loss while maintaining a high coupling efficiency and without introducing a loss of responsivity for the photodetector 14. The sidewalls 34, 35 of the semiconductor layer 26 may assist with sustaining modal overlap between the mode in the waveguide core 52 and the mode in the semiconductor layer 26.

In an alternative embodiment, the sidewall 35 may be formed between the sidewall 34 and the sidewall 36. In an alternative embodiment, the longitudinal axis 21 of the tapered section 20 of the waveguide core 12 and/or a longitudinal axis 53 of the tapered section 54 of the waveguide core 52 may be angled as shown in either FIG. 7 or FIG. 7A.

Figure 9:
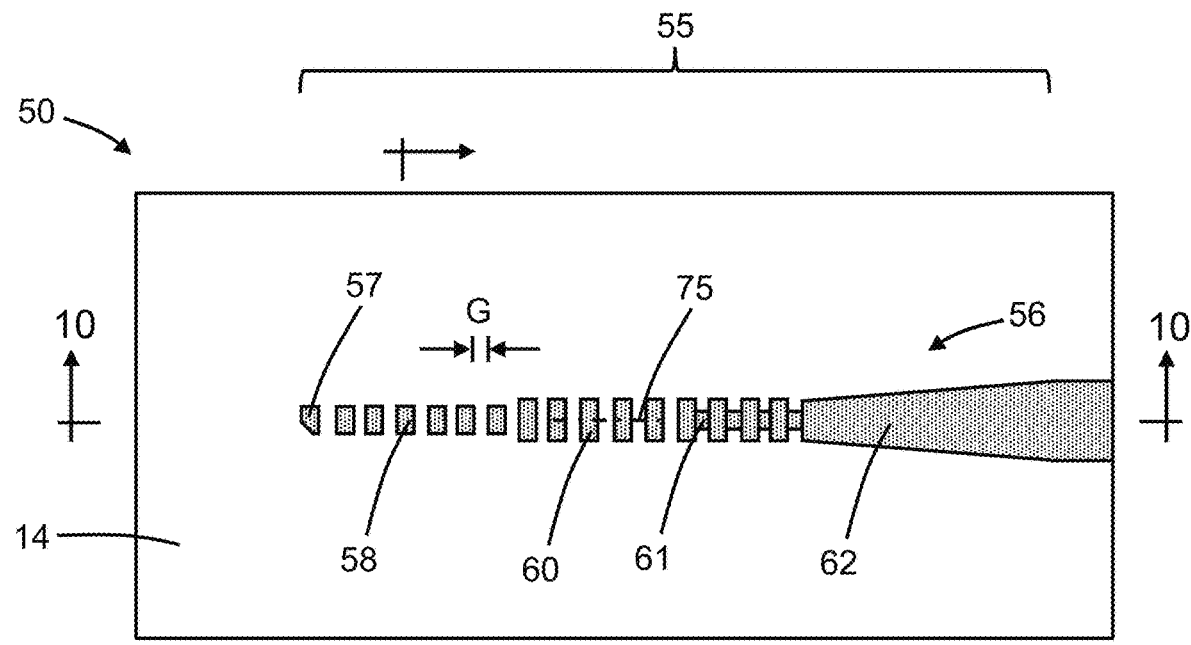
FIG. 9 is a top view of a structure at an initial fabrication stage of a processing method in accordance with embodiments of the invention.
Figure 9A:
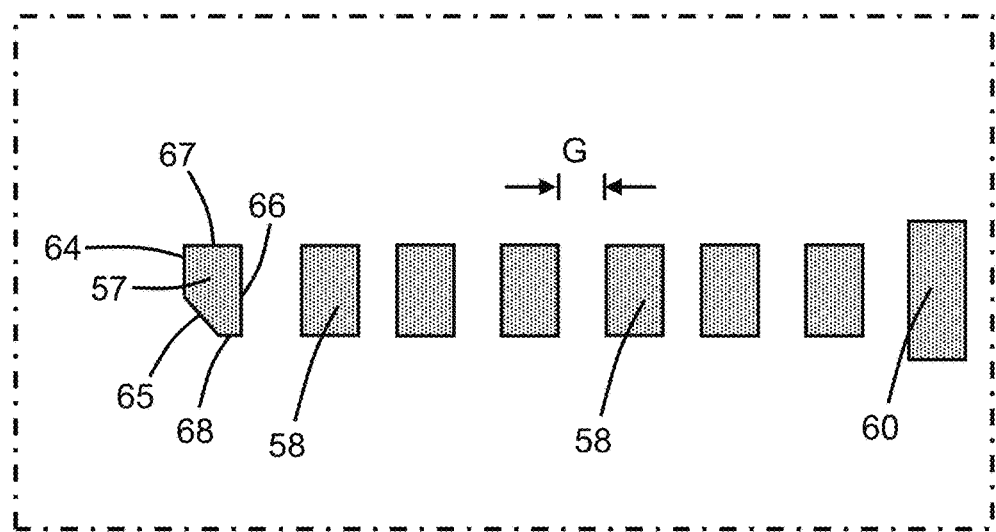
FIG. 9A is an enlarged view of a portion of FIG. 9.
Figure 10:
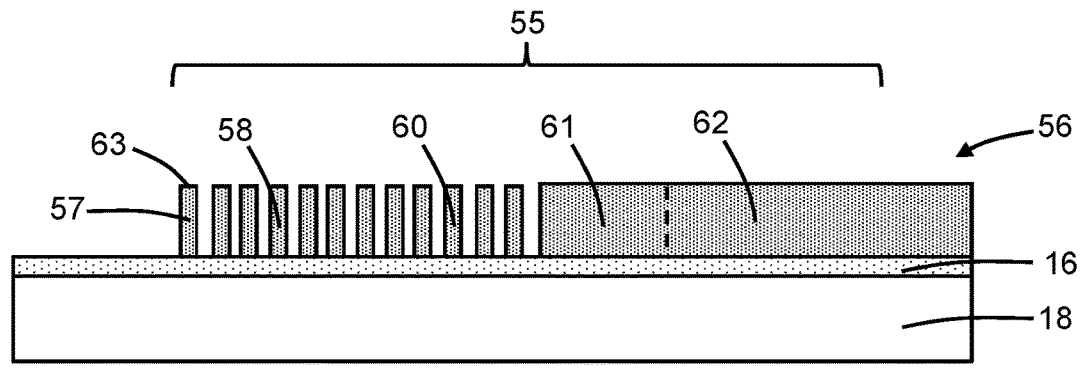
FIG. 10 is a cross-sectional view taken generally along line 10-10 in FIG. 9.

With reference to FIGS. 9, 9A, 10 and in accordance with embodiments of the invention, a structure 50 for a photonics chip includes a waveguide core 56 that is positioned on, and over, the dielectric layer 16 and semiconductor substrate 18. The waveguide core 56 is separated from the semiconductor substrate 18 by the dielectric material of the intervening dielectric layer 16. In an alternative embodiment, one or more additional dielectric layers comprised of, for example, silicon dioxide may be positioned between the waveguide core 56 and the upper surface of the dielectric layer 16.

In an embodiment, the waveguide core 56 may be comprised of a material having a refractive index that is greater than the refractive index of silicon dioxide. In an embodiment, the waveguide core 56 may be comprised of a semiconductor material, such as single-crystal silicon, amorphous silicon, or polysilicon. In an alternative embodiment, the waveguide core 56 may be comprised of a dielectric material, such as silicon nitride, silicon oxynitride, or aluminum nitride. In alternative embodiments, other materials, such as a III-V compound semiconductor, may be used to form the waveguide core 56.

In an embodiment, the waveguide core 56 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shape of the waveguide core 56. In an embodiment, the waveguide core 56 may be formed by patterning the semiconductor material (e.g., single-crystal silicon) of the device layer of a silicon-on-insulator substrate. In an embodiment, the waveguide core 56 may be formed by patterning a deposited layer comprised of its constituent material (e.g., silicon nitride).

The waveguide core 56 may include a segment 57, multiple segments 58, multiple segments 60, a rib 61 that overlaps with some of the segments 60, and a section 62 that is positioned adjacent to the section including the segments 60 and rib 61. The segments 57, 58, 60, the rib 61, and the section 62 of the waveguide core 56 may define an edge coupler 55 representing a photonic component. The segments 57, 58, 60, the rib 61, and the section 62 may be aligned along a longitudinal axis 75 of the edge coupler 55. The edge coupler 55 may be coupled by the section 62 of the waveguide core 56 to a photonic integrated circuit of the photonics chip. In an alternative embodiment, the rib 61 may be absent such that all of the segments 60 are disconnected from each other. In an embodiment, the edge coupler 55 may be configured to receive light from a light source, as subsequently described, that is that is routed by the waveguide core 56 to the photonic integrated circuit.

The segments 57, 58, 60 may be separated by gaps G. In an embodiment, the pitch and duty cycle of the segments 57, 58, 60 may be uniform to define a periodic arrangement. In alternative embodiments, the pitch and/or the duty cycle of the segments 57, 58, 60 may be apodized (i.e., non-uniform) to define an aperiodic arrangement. The segments 57, 58, 60 may be dimensioned and positioned at small enough pitch so as to define a sub-wavelength grating that does not radiate or reflect light at a wavelength of operation.

The segment 57 at the end of the edge coupler 55 has a non-rectangular shape from a perspective in a vertical direction normal to a top surface 63 of the segment 57. The shape of the segment 57 may be established when the edge coupler 55 is patterned. In an embodiment, the segment 57 may have more than four (4) sidewalls. In an embodiment and as best shown in FIG. 9A, the segment 57 may have a sidewall 64 and a sidewall 65 that are disposed adjacent to each other and that collectively define a facet of the edge coupler 55, a sidewall 66 that is disposed adjacent to one of the segments 58, and sidewalls 67, 68 that connect the sidewalls 64, 65 to the sidewall 66. In the representative embodiment, the sidewalls 64, 65, 66, 67, 68, which surround the segment 57, may have a pentagonal or pentangular shape. The sidewalls 64, 65, 66, 67, 68 may extend in a vertical direction from the dielectric layer 16 to the top surface 63. The sidewalls 64, 65, 66, 67, 68 may intersect at respective corners. In an embodiment, the facet of the edge coupler 55 may exclusively include the sidewalls 64, 65. In an embodiment, the facet of the edge coupler 55 may be asymmetrical in a transverse direction relative to the longitudinal axis 75.

The sidewall 65 defines a chamfer that connects the sidewall 64 to the sidewall 68. The sidewall 65 may adjoin the sidewall 64 at an interior angle similar to the interior angle α (FIG. 1), and the sidewall 65 may adjoin the sidewall 68 at an interior angle similar to the interior angle β (FIG. 1). In an embodiment, the interior angle between the sidewall 64 and the sidewall 65 may be an obtuse angle. In an embodiment, the interior angle between the sidewall 65 and the sidewall 68 may be an obtuse angle. In an embodiment, both interior angled may be obtuse angles.

Figure 11:
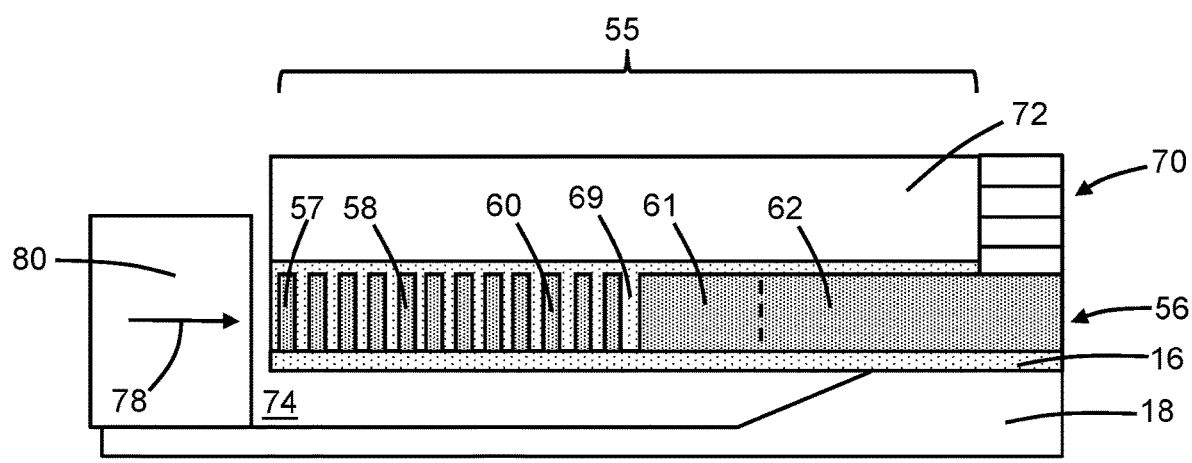
FIG. 11 is a cross-sectional view of the structure at a fabrication stage of the processing method subsequent to FIGS. 9, 9A, 10.

With reference to FIG. 11 in which like reference numerals refer to like features in FIGS. 9, 9A, 10 and at a subsequent fabrication stage, a dielectric layer 69 may be formed over the waveguide core 56. The dielectric layer 69 may be comprised of a dielectric material, such as silicon dioxide. The edge coupler 55 may be embedded in the dielectric layer 69.

The dielectric material of the dielectric layer 69 is positioned in the gaps G between adjacent pairs of the segments 57, 58, 60 of the edge coupler 55 such that a metamaterial structure may be defined in which the material constituting the segments 57, 58, 60 has a higher refractive index than the dielectric material of the dielectric layer 69. The metamaterial structure can be treated as a homogeneous material having an effective refractive index that is intermediate between the refractive index of the material constituting the segments 57, 58, 60 and the refractive index of the dielectric material constituting the dielectric layer 69.

A back-end-of-line stack 70 may be formed over the structure 10. A dielectric layer 72 that may be formed that replaces a removed portion of the back-end-of-line stack 70 over the edge coupler 55. A cavity 74 may be formed in the semiconductor substrate 18 adjacent to the edge coupler 55. The back-end-of-line stack 70 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide. The dielectric layer 72 may be comprised of a homogenous dielectric material, such as silicon dioxide. The cavity 74 may include a portion that extends as an undercut region beneath the dielectric layer 16 such that all or a portion of the edge coupler 55 is suspended on the dielectric layer 16 over the undercut region. The undercut region of the cavity 74 may function to reduce light loss to the semiconductor substrate 18.

A light source 80 may be placed into the cavity 74. The light source 80 may include a light output 78 that is aligned with the facet of the edge coupler 55 and that is configured to provide light in a mode propagation direction toward the facet of the edge coupler 55. In an embodiment, the light output 78 of the light source 80 may be aligned parallel to the longitudinal axis 75 of the edge coupler 55. In an embodiment, the sidewalls 64, 65 (FIGS. 9, 9A) of the segment 57 may face toward the light output 78 of the light source 80. In an embodiment, light from the light output 78 of the light source 80 may impinge the sidewalls 64, 65 of the segment 57. In an embodiment, light from the light source 80 may exclusively impinge the sidewalls 64, 65 of the segment 57 of the edge coupler 55 and none of the other sidewalls 66, 67, 68 of the segment 57. In an embodiment, the light output 78 of the light source 80 may be aligned normal to the sidewall 64 and at an angle relative to the sidewall 65.

In an embodiment, the light source 80 may be an optical fiber that includes a tip portion inserted into the cavity 74 adjacent to the edge coupler 55. In an embodiment, the optical fiber defining the light source 80 may output light in an infrared wavelength range. In an alternative embodiment, the light source 80 may be a laser chip that includes a semiconductor laser configured to output light from the light output 78 in an infrared wavelength range. In an embodiment, the laser chip may include a laser comprised of III-V compound semiconductor materials. In an embodiment, the laser chip may include an indium phosphide/indium-gallium-arsenic phosphide laser that is configured to generate continuous laser light in an infrared wavelength range. In an alternative embodiment, the light source 80 may include a photonic bump having internal turning mirrors and lensed mirrors that collimate and focus light received from an optical fiber and provide the collimated, focused light to the edge coupler 55.

Figure 12:
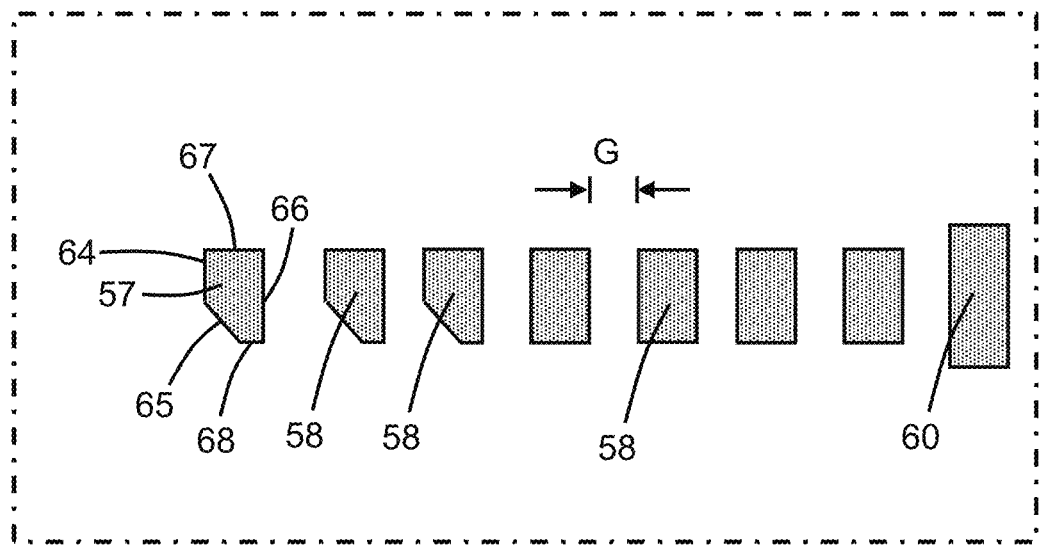
FIG. 12 is a top view of a structure in accordance with alternative embodiments of the invention.

With reference to FIG. 12 and in accordance with embodiments of the invention, one or more segments 58 of the edge coupler 55 that are adjacent to the segment 57 may be configured with a sidewall 88 that provides a chamfer similar to the sidewall 65 of the segment 57. The added sidewall 88 and a sidewall 89 of each modified segment 58 may face toward the light output 78 of the light source 80. The chamfering of these segments 58, which are adjacent to the facet defined by the sidewalls 64, 65 of the segment 57, may strengthen the performance improvements provided by the segment 57.

Figure 13:
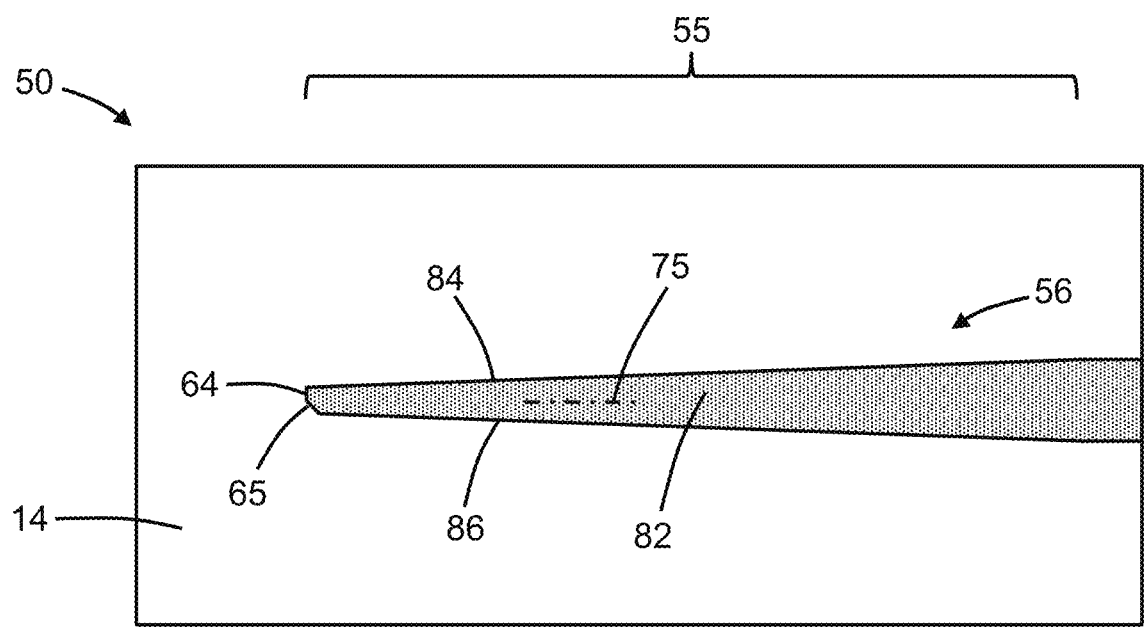
FIG. 13 is a top view of a structure in accordance with alternative embodiments of the invention.

With reference to FIG. 13 and in accordance with embodiments of the invention, the edge coupler 55 of the structure 50 may be configured as an inverse taper 82 that, upon the addition of the light source 80, has a width dimension that increases with increasing distance from the facet at the tip of the inverse taper 82. The facet of the inverse taper 82 includes the sidewalls 64, 65 that adjoin at an interior angle, which may be an obtuse angle, as previously described. The inverse taper 82 may have sidewalls 84, 86 that adjoin the sidewall 64, and the sidewall 65 may adjoin the sidewall 86 at an interior angle. In an embodiment, the interior angle between the sidewall 65 and the sidewall 86 may be an obtuse angle.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
    a substrate;
    a dielectric layer on the substrate;
    a photodetector including a pad on the dielectric layer, a first doped region in the pad, a second doped region in the pad, and a light-absorbing layer, the pad having a side edge, the first doped region having a first conductivity type, the second doped region having a second conductivity type opposite to the first conductivity type, the light-absorbing layer laterally positioned on a portion of the pad between the first doped region and the second doped region, the portion of the pad comprising intrinsic semiconductor material, the light-absorbing layer having a longitudinal axis, a first sidewall, and a second sidewall adjoined to the first sidewall at a first interior angle, the first sidewall slanted relative to the longitudinal axis, and the second sidewall oriented transverse to the longitudinal axis; and
    a first waveguide core on the dielectric layer, the first waveguide core including a tapered section connected to the side edge of the pad, and the tapered section adjacent to the first sidewall and the second sidewall of the light-absorbing layer.

2. The structure of claim 1 wherein the tapered section of the first waveguide core has a longitudinal axis that is aligned with the longitudinal axis of the light-absorbing layer.

3. The structure of claim 2 wherein the longitudinal axis of the tapered section of the first waveguide core is aligned parallel to the longitudinal axis of the light-absorbing layer.

4. The structure of claim 1 wherein the tapered section of the first waveguide core has a longitudinal axis that is aligned at an acute angle relative to the longitudinal axis of the light-absorbing layer.

5. The structure of claim 1 wherein the first interior angle is an obtuse angle.

6. The structure of claim 5 wherein the light-absorbing layer has a third sidewall, the first sidewall is adjoined to the third sidewall at a second interior angle, and the second interior angle is an obtuse angle.

7. The structure of claim 5 wherein the light-absorbing layer has a third sidewall, the second sidewall is adjoined to the third sidewall at a second interior angle, and the second interior angle is a right angle.

8. The structure of claim 1 wherein the light-absorbing layer has a third sidewall and a fourth sidewall adjoined to the third sidewall at a second interior angle, the third sidewall is slanted relative to the longitudinal axis, and the fourth sidewall is oriented transverse to the longitudinal axis.

9. The structure of claim 8 wherein the first interior angle and the second interior angle are obtuse angles.

10. The structure of claim 8 wherein the light-absorbing layer has a fifth sidewall, the fifth sidewall is adjoined to the first sidewall at a third interior angle, the fifth sidewall is adjoined to the third sidewall at a fourth interior angle, and the third interior angle and the fourth interior angle are obtuse angles.

11. The structure of claim 8 further comprising:
    a second waveguide core including a tapered section adjacent to the third sidewall and the fourth sidewall of the light-absorbing layer.

12. The structure of claim 1 wherein the light-absorbing layer comprises germanium.

13. A method of forming a structure for a photonics chip, the method comprising:
    forming a photodetector including a pad on a dielectric layer, a first doped region in the pad, a second doped region in the pad, and a light-absorbing layer, wherein the dielectric layer is positioned on a substrate, the pad has a side edge, the first doped region has a first conductivity type, the second doped region has a second conductivity type opposite to the first conductivity type, the light-absorbing layer is laterally positioned on a portion of the pad between the first doped region and the second doped region, the portion of the pad comprises intrinsic semiconductor material, the light-absorbing layer has a longitudinal axis, a first sidewall, and a second sidewall adjoined to the first sidewall at an interior angle, the first sidewall is slanted relative to the longitudinal axis, and the second sidewall is oriented transverse to the longitudinal axis; and
    forming a waveguide core on the dielectric layer, wherein the waveguide core includes a tapered section connected to the side edge of the pad, and the tapered section is adjacent to the first sidewall and the second sidewall of the light-absorbing layer.

14. The structure of claim 1 wherein the tapered section of the first waveguide core has a width dimension that increases with decreasing distance from the side edge of the pad.

15. The structure of claim 1 wherein the first waveguide core and the pad of the photodetector comprise single-crystal silicon.

16. The structure of claim 12 wherein the first waveguide core and the pad of the photodetector comprise single-crystal silicon.

17. The structure of claim 1 wherein the pad has a top surface, and the light-absorbing layer has a first portion that is disposed above the top surface of the pad and a second portion that is disposed below the top surface of the pad.

18. The structure of claim 1 wherein the side edge of the pad is positioned between the tapered section of the first waveguide core and the first sidewall of the light-absorbing layer, and the side edge of the pad is positioned between the tapered section of the first waveguide core and the second sidewall of the light-absorbing layer.

19. The structure of claim 1 further comprising:
- a plurality of dielectric layers on the photodetector and the first waveguide core;
- a first contact that penetrates fully though the plurality of dielectric layers to the first doped region; and
- a second contact that penetrates fully though the plurality of dielectric layers to the second doped region.

20. The structure of claim 2 wherein the longitudinal axis of the tapered section of the first waveguide core is aligned with the portion of the pad.

* * * * *